June 1, 1937. W. R. KAUFFMAN 2,081,933
AUTOMATIC DOUGH DIVIDER
Filed March 16, 1936 2 Sheets-Sheet 1
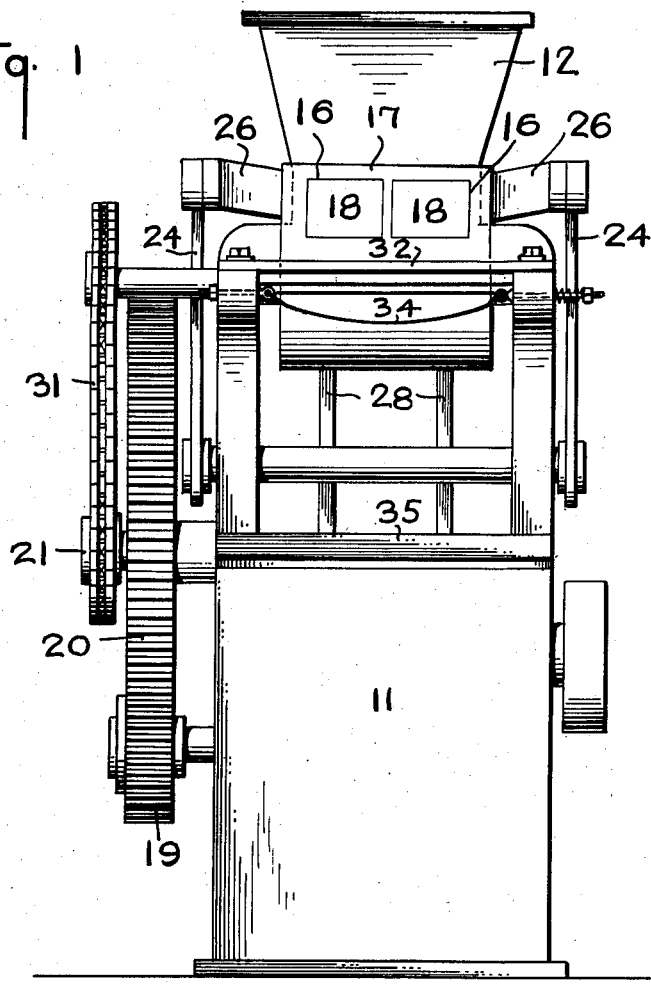
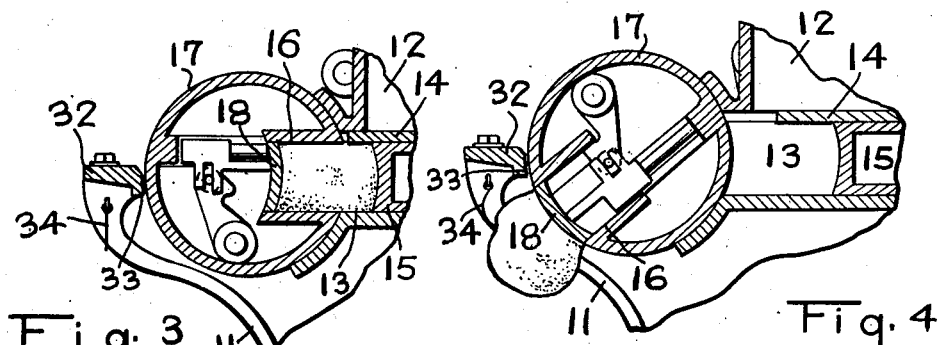
INVENTOR
W. R. KAUFFMAN
ATTORNEY June 1, 1937. W. R. KAUFFMAN 2,081,933
AUTOMATIC DOUGH DIVIDER
Filed March 16, 1936 2 Sheets-Sheet 2
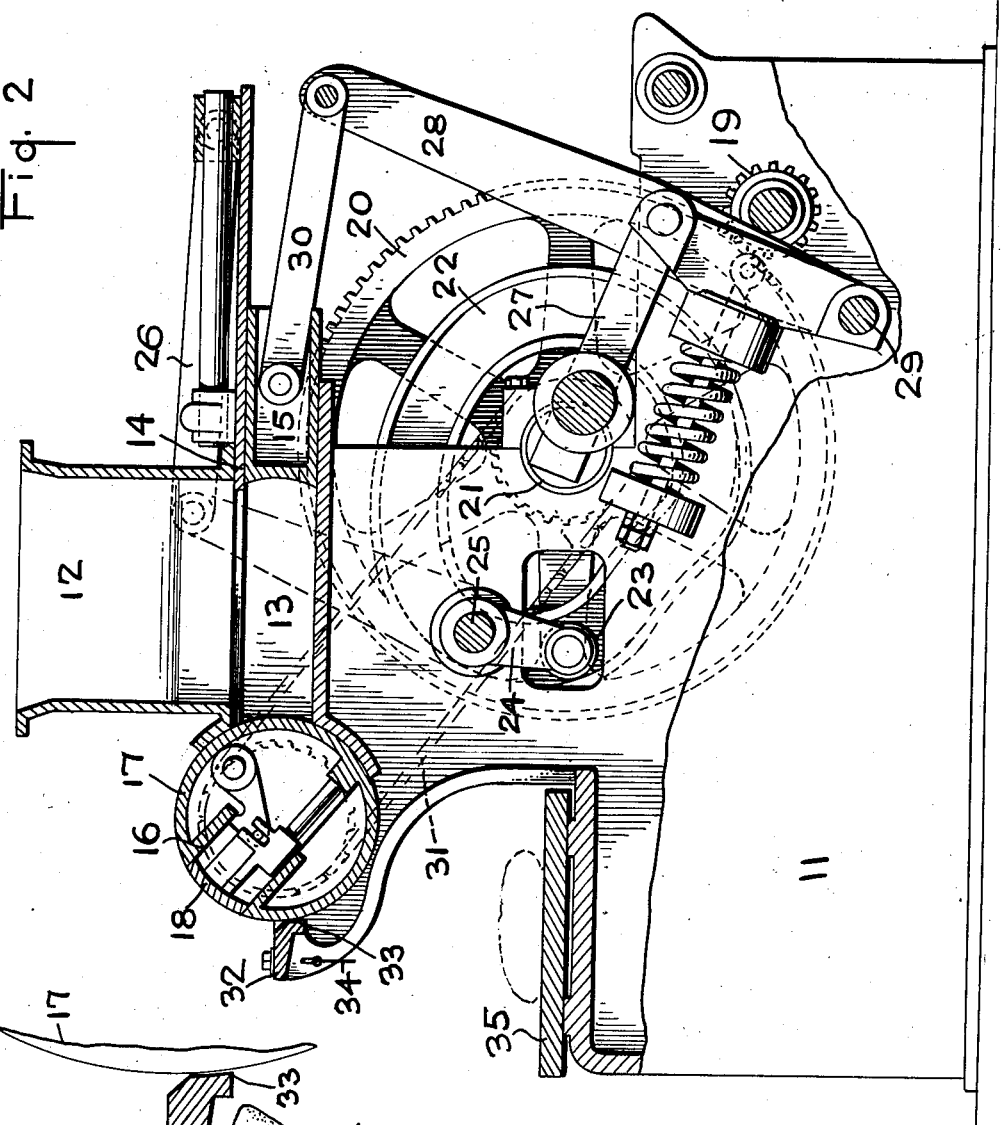
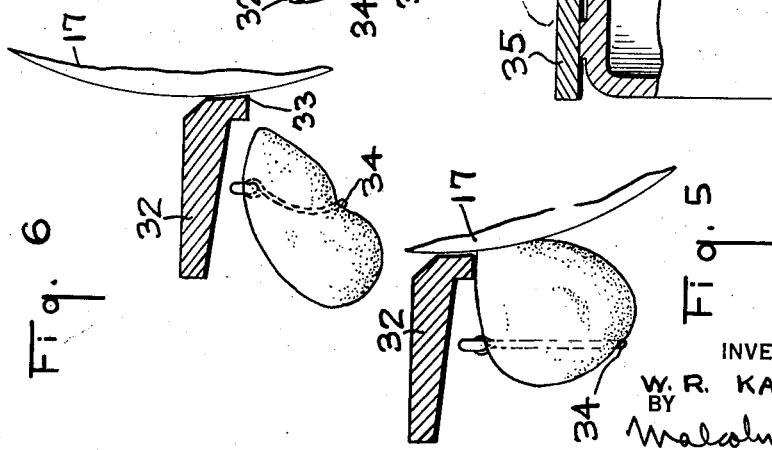
INVENTOR
W. R. KAUFFMAN
BY
Malcolm F. Gannett
ATTORNEY Patented June 1, 1937

2,081,933

UNITED STATES PATENT OFFICE 2,081,933

AUTOMATIC DOUGH DIVIDER

William R. Kauffman, York, Pa.

Application March 16, 1936, Serial No. 69,075

2 Claims. (Cl. 107—15)

This invention relates to improvements in dough handling machinery and particularly to the type of apparatus known as automatic dough dividers.

Dough dividers generally comprise a hopper, from which dough is fed by gravity to a compression box. From this compression box, the dough is usually expelled by a plunger into one or more pockets or recesses in what is called a measuring head, because the size or area of each pocket determines the size or volume of the individual lumps of dough thus formed. This method of dividing dough has proved generally satisfactory but nevertheless there have been difficulties which the industry has sought to overcome. One of the most important ones has been the difficulty of cleanly and quickly removing the lumps of dough from the measuring head.

An object of the present invention is to provide an improved automatic dough divider having means for detaching and quickly removing the lumps of dough from the measuring head.

Another object of the invention is to provide an improved dough divider wherein the measuring head is maintained clean of dough irrespective of the size of the lumps of dough formed in the measuring head.

Another object of the invention is to provide an improved dough divider of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings:—

Figure 1 is a front elevation of an automatic dough divider embodying the present invention;

Fig. 2 is a side elevation partly in vertical section of the machine shown in Fig. 1, the measuring head being shown in a position immediately following the discharge of a lump of dough therefrom;

Fig. 3 is a detail section of the measuring head in position to receive a charge of dough;

Fig. 4 is a detail section of the measuring head discharging a lump of dough; and Figs. 5 and 6 are diagrammatic views illustrating the manner in which the lumps of dough are removed from the measuring head.

In the type of divider illustrated in the drawings, there is mounted above the main frame 11, a hopper 12, from which dough may gravitate or flow into a compression box 13, except when the opening between said hopper and box is closed by a reciprocatory knife 14.

Slidable in the box 13 is a plunger 15 by which dough in the box may be compressed and forced into pockets 16 measuring head 17.

The measuring head 17, which is preferably cylindrical in cross section, may be formed with any number of pockets 16 spaced longitudinally thereof, and in each pocket 16 there is a plunger 18 adapted to be retracted when dough is forced into the pockets. The connections, control and operation of the plungers 18 are fully disclosed in patents, Nos. 1,703,126 and 1,740,049.

The operating mechanism of the apparatus may comprise a gear 19 rotated by power from a suitable source, said gear being in meshing relationship with a larger gear 20 on a main shaft 21.

Mounted on the shaft 21 is a cam member having a cam slot or groove 22 for a cam roller 23 carried by a lever 24 pivoted at 25 and connected by a link 26 to the knife 14.

Connected eccentrically to the main shaft 21 is a link 27 for rocking levers 28 pivoted at 29 and connected by links 30 to the compression box plunger 15.

The measuring head 17 is continuously rotated by a drive chain 31 from the main shaft 21.

The contour of the cam slot 22 and the speed of rotation of the measuring head 17 is such that with the parts in the positions illustrated in Fig. 2, their operation for a complete cycle is as follows:—

Rotation of cam 22 advances the plunger 15 and all but closes the opening between the box 13 and hopper 12 by advancing knife 14. Continued movement of the cam 22 further advances the plunger 15 while the knife remains stationary. During this portion of the advance of the plunger 13, the unyielding surface of the measuring head 17 is presented to the dough then being compressed by the plunger 15.

As shown in Fig. 3, further movement of the head 17 has brought the pockets 16 in registry with the box 13. At the same time, knife 14 has been moved to its fully closed position and plunger 15 advanced to force the dough into the pockets 16.

Further movement of these several elements carries the pockets beyond the box 13, severing the dough therein from any dough remaining in the box.

The dough in the pockets 16 is discharged therefrom at the proper point (see Fig. 4) by the action of pocket plungers 18. The retraction of knife 14 and box plunger 15 is continued until these elements assume the positions in which they are shown in Fig. 2.

During the rotation of the measuring head 17 from the position illustrated in Fig. 4 to the position shown in Fig. 2, the lumps of dough discharged from the pockets 16 adhere to the outer surface of plungers 18, and in order to detach the lumps of dough from the plungers 18, I utilize a bar 32 having a knife edge 33 formed thereon in slightly spaced relation to the exterior of the cylindrical surface of the measuring head 17.

The bar 32 is detachably mounted on the main frame 11 of the apparatus at a point substantially coincident with the center of rotation of the measuring head 17.

Due to the stickiness of the lumps of dough it has been found that, during continuous operation of the apparatus, the dough adheres to the exterior of the measuring head 17 and means other than the bar 32 are necessary in order to detach the dough from the surface of the measuring head after the same has been forced outwardly from the pockets 16 through the action of the plungers 18.

According to the present invention one form of such dough detaching means may comprise a flexible element in the form of a strand of wire 34 which is disposed beneath the bar 32 and in the path of the dough carried upwardly on exterior of the measuring head 17.

Each end of the wire 34 is secured to the main frame 11 at a suitable point beneath the point at which the bar 32 is attached to the frame 11, and said wire preferably hangs or loops downward slightly as shown in Fig. 1.

During the upward movement of the lump of dough from the position shown in Fig. 4 to that shown in Fig. 5, the outer portion of the lump of dough comes in contact with the strand of wire 34 and this action causes the wire to swing.

Immediately following the contact the lump of dough with the wire 34, the main body of the dough on the measuring head comes in contact with the knife edge 33 of the bar 32, and the dough is then cleanly severed or detached from the exterior of the measuring head 17 as shown in Fig. 6.

Due to the upward movement of the measuring head 17 at this point, the inner portion of the lump of dough is swung upwardly, the wire 34 acting as a cradle and the dough rolls outwardly over the wire and falls upon a table 35 or other element from which it is removed from the machine.

In this way the sticky lumps of dough are quickly and cleanly removed from the machine after being discharged from the pockets 16 of the measuring head 17 and consequently the speedy and continued operation of the machine is not hindered by particles of dough adhering to the measuring head.

Changes may be made in the details of construction and in the arrangement of the parts above described within certain limits without departing from the spirit of the invention.

Having thus described my invention what I claim is:—

1. In a dough divider, the combination of a member having a measuring cavity therein, means for feeding a body of dough into said cavity, means for discharging the dough from said cavity, a flexible element disposed in the path of the discharged dough, and means cooperating with said flexible element for severing the dough from the member.

2. In a dough divider, the combination of a rotatable measuring head having a measuring cavity therein, means for feeding a body of dough into said cavity, means for forcing the dough from said cavity, a flexible element disposed in the path of the dough discharged from the cavity, and a rigid bar cooperating with said flexible element for intercepting the dough and severing the same from said measuring head.

WILLIAM R. KAUFFMAN.